United States Patent [19]

Sato et al.

[11] Patent Number: 4,943,957
[45] Date of Patent: Jul. 24, 1990

[54] HIGH-DENSITY INFORMATION RECORDING CARRIER

[75] Inventors: Masaru Sato; Nagayoshi Tsukane, both of Himeji, Japan

[73] Assignee: Daicel Chemical Industries, Ltd., Osaka, Japan

[21] Appl. No.: 259,495

[22] Filed: Oct. 17, 1988

Related U.S. Application Data

[63] Continuation of Ser. No. 874,963, Jun. 16, 1986, abandoned.

[30] Foreign Application Priority Data

Jun. 18, 1985 [JP] Japan ................ 60-132146
Jun. 18, 1985 [JP] Japan ................ 60-132147
Jun. 18, 1985 [JP] Japan ................ 60-132148

[51] Int. Cl.$^5$ .............................. G11B 5/66
[52] U.S. Cl. ................... 428/694; 369/268; 369/288; 428/699; 428/900; 360/135; 365/122
[58] Field of Search ........... 428/694, 699, 900; 360/131-135; 365/122; 369/13, 288, 14, 286; 430/945

[56] References Cited

U.S. PATENT DOCUMENTS 3,645,779  2/1972  Klenel .
4,186,221  1/1980  Hall et al. .................. 427/45
4,403,231  9/1983  Ando et al. .
4,417,290 11/1983  Tanaka et al. .
4,443,806  4/1984  Ando ...................... 346/135.1
4,449,138  5/1984  Ando ...................... 346/135.1
4,579,777  4/1986  Honguu et al. ............ 428/472
4,831,608  5/1989  Tsukane et al. ........... 369/14

FOREIGN PATENT DOCUMENTS 0139474    5/1985  European Pat. Off. .
163810    12/1985  European Pat. Off. .
3500314    7/1985  Fed. Rep. of Germany .
54056      3/1984  Japan .
57-172539 10/1986  Japan .
8200393    9/1982  Netherlands .
1313866    4/1973  United Kingdom .
2047420    8/1983  United Kingdom .
2143689    2/1985  United Kingdom .

OTHER PUBLICATIONS

"Glass to Metal Seals", J. H. Partridge, The Society of Glass Technology, p. 228 (1949).

Primary Examiner—George F. Lesmes
Assistant Examiner—Dennis Carmen
Attorney, Agent, or Firm—Armstrong, Nikaido, Marmelstein, Kubovcik & Murray

[57] ABSTRACT

A high-density information recording carrier such as an optical disk which is used for recording and/or playing back information carried on a plastic substrate by means of laser beams has an improved protective layer between a recording layer and the plastic substrate. The protective layer is made of inorganic glass made of alkali-free glass containing less than 1 wt % of alkali metal oxides. The resulting optical disk shows improved durability, higher C/N, lower BER and higher film forming rate.

5 Claims, 1 Drawing Sheet

HIGH-DENSITY INFORMATION RECORDING CARRIER

This application is a continuation of application Ser. No. 874,963, filed June 16, 1986, now abandoned.

FIELD OF INDUSTRIAL APPLICATION

The present invention relates to a high-density information recording carrier which is used to record and play-back information on a recording layer by a laser beam. Particularly, the invention relates to an optical disk, and more particularly a magneto-optical recording disk, having a plastic substrate.

PRIOR ART

In optical discs it is technically most important to improve the durability or reliability when a plastic substrate is used. Although a plastic substrate has many advantages over a glass substrate, it has a serious drawback. The recording layer formed on a plastic substrate is degraded by residual water and monomer in the plastic substrate and also by water infiltrating through the plastic substrate.

To eliminate the above drawback, the present inventors have proposed a recording carrier made of a plastic substrate and a recording layer, with a thin film of alkali-free glass interposed between them. (Japanese Patent Application No. 32230/1984, "Optical Information Recording Carrier", filed on Feb. 22, 1984.) The thin film of alkali-free glass greatly improves the durability of optical discs and provides satisfactory optical discs. To improve the previous invention further, the present inventors carried out further experiments and found prefered conditions which can reduce BER (bit error rate) without deteriorating the durability of the optical discs. As a result, the inventors arrived at the present invention.

OBJECTS OF THE INVENTION

It is an object of the present invention to provide an optical information recording carrier which has a lower BER and which is stable over a long period of time. These advantageous features are due to the fact that the plastic substrate has improved smoothness, hardness and has moisture resistance, similar to a glass substrate, so that the functional film or recording layer is protected from degradation by the substrate.

It is another object of the present invention to provied a high-density information recording carrier in which the functional film or recording layer of rare earth-transition metal amorphous alloy is greatly improved in magneto-optical recording properties.

THE DRAWINGS

DESCRIPTION OF THE INVENTION

The present invention resides in a high-density information recording carrier including a transparent plastic substrate, a thin film layer of inorganic glass formed on the substrate, and a high-density information recording layer formed on the thin film layer of inorganic glass. The invention is characterised in that said thin film layer of inorganic glass is made of alkali-free glass which contains less than 1 wt% of alkali metals, namely Li, Na, K, Rb, Cs, and preferably less than 0.8 wt% of the alkali metals in terms of alkali metal oxides.

The transparent plastic substrate and the high-density information recording layer used in the present invention are described in detail in U.S. Pat. No. 4,831,608 and are not explained now.

Figure 1:
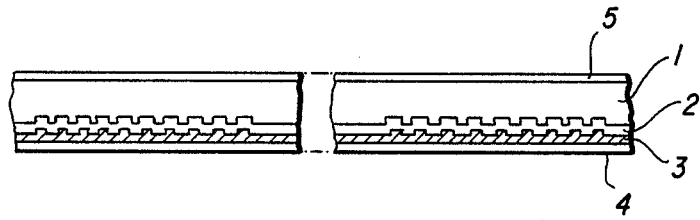
FIG. 1 is an illustrative cross sectional view of an optical disk to which the present invention is applicable.

The common structure of an optical disk is schematically shown in FIG. 1. The optical disc is made of a transparent plastic substrate 1, a protective layer 2, a recording medium layer 3, a surface protective layer 4, and an external protective layer 5 (which is provided as required).

The substrate 1 is made of any transparent plastic such as acrylic resin, polycarbonate resin, epoxy resin, and styrene resin. The first three resins are preferred because of their birefringence, moldability, and stability characteristics.

The high-density information recording medium 3 may be of any known type such as DRAW (direct read after write) and E-DRAW (erasable direct read after write).

In the conventional optical disc, the protective layer 2 is made of an oxide such as $SiO_2$ and $TiO_2$ or an organic polymer such as organopolysiloxane. The characteristic feature of this invention resides in the protective layer 2 which is made of inorganic glass having special properties.

The protective layer 2 of inorganic glass has a thickness of 100 to 2,000 Å. If the thickness is less than 100 Å, the protection is not satisfactory. If the protective layer is thicker than 2,000 Å it is uneconomic and poses a problem due to the absorption of laser light. The inorganic glass layer 2 may be formed by vapor deposition, sputtering, or ion plating. The inorganic glass is preferably so-called alkali-free glass which is a glass containing no or a little amount of alkali metals. Alkali-free glass is commercially available from, for example, Corning Glass Works under a product number 7059. It is composed of $SiO_2$ (49.9%), BaO (25.1%), $B_2O_3$ (10.5%), $Al_2O_3$ (10.3%), and CaO (4.3%). This is exemplary, and not a limitative example of the inorganic glass in this invention. The inorganic glass is not specifically limited so long as it permits the formation of a thin film thereon by physical vapor deposition.

According to this invention, the above-described inorganic glass is used to make the protective layer 2 interposed between the plastic substrate 1 and a recording layer 3. It may also be used to make the protective layer 4 which is external to a recording layer 3 and to make the protective layer 5 external to the plastic substrate 1.

The above-described inorganic glass layer is superior, particularly in resistance to moisture absorption, to the conventional protective layer made of a simple substance such as $SiO_2$ and $TiO_2$.

The present invention produces the best result when applied to a magneto-optical disc in which the high-density information recording layer is made of a rare earth-transition metal amorphous alloy. The recent rapid increase in the amount of information has necessitated the development of high-density recording and high-speed access. To meet this requirement, there has been developed a thin film of amorphous alloy composed of rare earth elements and transition metals, e.g., TbFe, TbFeCo, and GdTbFe. The thin film has an easy magnetization axis in a direction perpendicular to the film surface. In view of this, the thin film is drawing public attention as a high-density information recording medium capable of recording, retrieving, and erasing. The information recording disc will find use as document files, still picture files, moving picture files, and computer memories.

In order to utilize this improvement, it is important to reduce the error rate and to increase the signal-to-noise ratio of the recording medium. These factors are associated with the recording medium, and they are adversely affected by (1) uneven film thickness and alloy composition, (2), uneven magnetic properties, and (3) degradation by oxidation. The performance of the recording medium depends on the cleanliness, smoothness, and flawlessness of the substrate.

The above-mentioned three problems can be eliminated simultaneously when the inorganic glass layer 2 is interposed between the plastic substrate 1 and the recording medium layer 3 of rare earth-transition metal amorphous alloy. As a result, it is possible to obtain a magneto-optical recording carrier (referred to as magneto-optical disc hereinafter) of practical use.

The magneto-optical recording medium to which the present invention can be applied is a rare earth-transition metal amorphous alloy of any known type. Examples of the alloy include Tb-Fe alloy (Japanese Patent Publication No. 20691/1982), Dy-Fe alloy (Japanese Patent Publication No. 20692/1982), Gd-Tb-Fe alloy (Japanese Patent Laid-open No. 126907/1981), Gd-Tb-Dy-Fe alloy (Japanese Patent Laid-open No. 94948/1982), Gd-Co (Japanese Patent Laid-open No. 121719/1979), and Tb-Fe-Co alloy. The layer of rare earth-transition metal alloy can be formed on the inorganic glass layer by deposition, sputtering, or ion plating. The thickness of the layer is usually 500 to 1,500 Å.

According to this invention the inorganic glass layer 2 has the same composition and thickness as mentioned above.

Heretofore, there has been much investigation of the formation of an amorphous layer on a glass substrate, and it is now possible to form an amorphous layer capable of perpendicular magnetization on a glass substrate. However, there is no established technology for forming a stable amorphous layer capable of perpendicular magnetization on a plastic substrate. In the case of an amorphous layer formed on a glass substrate, the Kerr rotary angle is greater than 0.3 degrees, whereas in the case of an amorphous layer formed on a plastic substrate, the Kerr rotary angle is 0.1 degrees at best. It may sometimes be possible to obtain an amorphous layer having a Kerr rotary angle greater than 0.2 degrees; but this is not stable for a long period of time and it is poor in reproducibility. Because of this, there is a strong demand for technology for forming a stable amorphous layer capable of perpendicular magnetization on an easy-to-handle plastic substrate in place of the conventional glass or aluminum substrate.

According to the present invention, there is provided a magneto-optical disc of practical use, which is based on a plastic substrate. The completion of the new magneto-optical disc is attributable to the above-mentioned inorganic glass layer 2, which permits a stable amorphous alloy layer to be formed on a plastic substrate. The magneto-optical disc in accordance with this invention has almost the same C/N ratio as the conventional magneto-optical disc based on a glass substrate.

The invention will now be described with reference to a magneto-optical disc, although the invention will be applicable to any known recording medium of DRAW type. The magneto-optical recording medium was chosen as an example for explanation because it requires higher performance, particularly in moisture resistance, than a recording medium of DRAW type. Any recording medium that satisfies the stringent requirements of a magneto-optical recording medium would be satisfactorily applicable to a recording medium of DRAW type. Apparently, it is also applicable to any E-DRAW medium of phase-change type and form-change type which requires durability.

The first feature of the present invention resides in that the amount or proportion of alkali metals in the alkali-free glass is less than 1 wt%, preferably less than 0.8 wt%, in terms of alkali metal oxides. In other words, the alkali-free glass contains less than 1 wt%, preferably less than 0.8 wt%, of alkali metals (Li, Na, K, Rb, and Cs) in terms of their oxides.

If the amount of alkali metal is greater than 1 wt% in terms of alkali metal oxide, cracks occur in the recording layer, destroying the recorded data this results in a lower BER. The reason for this is not known. It appears, however. that the alkali metal reacts with moisture that has infiltrated through the plastic substrate, monomer that has migrated from the plastic substrate, or moisture in the air, to degrade the recording layer. The amount of the alkali metal should preferably be less than 0.8 wt% in terms of alkali metal oxide, and the lower the amount of alkali metal, the more desirable, unless the properties of the glass are adversely affected. It is industrially impossible to eliminate alkali metal completely; and alkali metal up to 1 wt% will not pose any practical problem.

The alkali-free glass used in this invention does not include silica glass composed almost entirely of $SiO_2$. The protective layer formed by the deposition of $SiO_2$ alone has been known; but the thin film of silica glass has almost no moisture resistance.

The thickness of the thin film of the inorganic glass should be 100 to 2,000 Å. With a thickness less than 100 Å, the thin film does not perform the protective function satisfactorily with a thickness greater than 2,000 Å, the thin film absorbs laser light and is uneconomical.

The present invention is advantageously applied to an optical disc in which the high-density information recording medium is a magneto-optical recording material of rare earth-transition metal amorphous alloy, e.g., TbFeCo. Apparently, it is applicable also to other high-density information recording carrier on which is formed a recording material which is susceptible to the monomer and moisture in the plastic substrate and/or the mositure in the air.

It is a matter of course that the thin protective layer of inorganic glass can be formed on the outside of the recording layer, or on the opposite side of the substrate, to isolate the recording layer from the atmosphere.

The second feature of the present invention is that the inorganic glass contains further, from 20 wt% to 35 wt% of alkaline earth metals, in terms of alkaline earth metal oxides.

The alkaline earth metal oxide is at least one oxide selected from the group consisting of BaO, CaO, MgO, SrO and BeO. Preferably, the oxides consist mainly of CaO and BaO and more preferably, BaO.

The components which constitute the inorganic glass can be materials that are used to form glass along with the alkaline earth metals and may be oxides of silicon, alumimium, boron, lead or the like such as SiO, $Al_2O_3$, $B_2O$, PbO. If the amount of alkaline earth metal oxide is not greater than 20 wt%, it is difficult to produce the inorganic glass because of a rise in the melting point as a well as decrease of the sputtering rate. If the amount of the oxide exceeds 35 wt%, the resistance to water and acids decrease, so that a thin film layer made of the resulting inorganic glass shows a lower resistance to humidity. Therefore, the final optical recording disk has lower performance. In fact, durability of an optical recording disk can be improved, and the speed of forming the thin film layer of the inotganic glass can be increased when the amount of alkaline earth metals is limited within the abovementioned range according to the present invention. The reason why the durbility is improved by such a limitation is not clear, but the amount of the alkaline earth meatls is related to the formation of the inorganic glass layer judging from the increase of sputtering rate.

The third feature of the present invention is that the inorganic glass has a coefficient of linear expansion in the range of 40 to $70 \times 10^{-7}/°$ C. so as to improve further BER of the resulting disk. If the coefficient is outside this range, cracks occur in the recording layer resulting in lowering the BER. The coefficient of linear expansion of inorganic glass can be varied to any desired value by changing the composition of the glass.

The thin flim layer of the inorganic glass can be produced by any conventional physical vapour deposition technique such as sputtering, vaccum deposition, or ion-plating. Theoretically, the thin film layer of inorganic glass can be produced on a plastic substrate by using any suitable method such that a plurality of components are vaccum-depositted from more than two sources which will form inorganic glass having the proportions of alkali metals and/or alkaline earth metals defined in the Claim. In the case of production of an industrial scale, a source of inorganic glass, including the abovementioned alkaline earth metals and/or alkali metals is prepared and is vapour-depositted physically.

The invention is now described with reference to the following examples.

EXAMPLE 1

Optical discs were prepared as follows: The plastic substrate is a 1.2 mm thick polymethyl methacrylate (PMMA) substrate or polycarbonate (PC) substrate. A thin film of inorganic glass was formed on the substrate by sputtering using an RF magnetron sputtering apparatus made by Nippon Shinku Gijutsu Co., Ltd. The thickness of the thin film is 500 Å. The composition of the inorganic glass is shown in Table 1. A recording layer of amorphous alloy was formed on the inorganic glass film using the same sputtering apparatus as mentioned above. The amorphous alloy has a composition of $Gd_{0.12}Tb_{0.12}Fe_{0.76}$. The thickness of the recording layer is 1000 Å. A protective thin layer of inorganic glass was formed on the recording layer by sputtering in the same manner as mentioned above. The inorganic glass has the same composition as mentioned above. The thickness of the thin layer is 1000 Å.

The optical discs thus obtained were evaluated by measuring the change of BER and C/N ratio that took place after the discs had been kept at 45° C. and 90 %RH for 30 days. (The change of BER is expressed by comparison with the initial value ($=1$), and the change of C/N ratio is expressed in terms of decrease (in dB) from the initial value.)

Table 1 shows that BER can be reduced when the amount of alkali metal (Na) is reduced to less than 1 wt% in terms of alkali metal oxide ($Na_2O$).

TABLE 1

|  |  | Sample No. |  |  |  |  |  |
|---|---|---|---|---|---|---|---|
|  |  | A |  | B |  | C |  |
| Proportion of glass components (wt %) |  |  |  |  |  |  |  |
| SiO$_2$ |  | 49.9 |  | 49.9 |  | 49.9 |  |
| Al$_2$O$_3$ |  | 10.3 |  | 10.3 |  | 10.3 |  |
| B$_2$O$_3$ |  | 10.5 |  | 10.5 |  | 10.5 |  |
| BaO |  | 25.1 |  | 25.1 |  | 25.1 |  |
| CaO |  | 3.8 |  | 3.3 |  | 2.3 |  |
| Na$_2$O |  | 0.5 |  | 1.0 |  | 2.0 |  |
| Material of the substrate | PMMA PC | * | * | * | * | * | * |
| Decrease of BER (the initial value of BER = 1) |  | 2 | 1 | 5 | 1.5 | 15 | 10 |
| Change of C/N in dB (decrease of C/N after 30 days) |  | 3 | 0 | 5 | 0 | 10 | 5 |

EXAMPLE 2

The same procedure as used in Example 1 was repeated, but in this case, the thickness of the thin film layer of inorganic glass having the same glass components as the Sample No. A in the Example 2 is changed to 250, 500, 750, 1000 and 2000 Å respectively on a substrate of polycarbonate resin.

Figure 2:
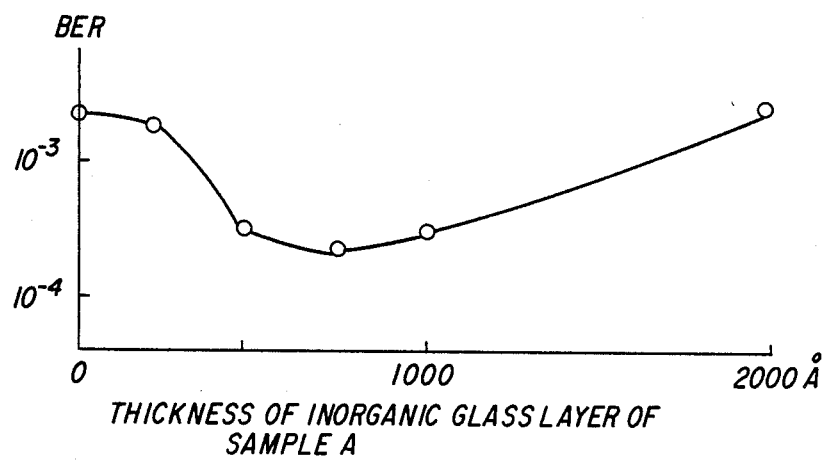
FIG. 2 is a graph showing the relationship between the value of BER of magneto-optical recording disks having a variety of thickness of the inorganic glass protective layer described in Example 2 and the value of the thickness after 30 days under the conditions of 45° C. and 90% relative humidity.

FIG. 2 shows the value of BER of the resulting magneto-optical disk when the BER is measured after 30 days during which time the disk is maintained under conditions of 45° C. and 90% relative humidity."

It is apparent from FIG. 2 that the thickness of the thin film layer of inorganic glass is advantageously within the range of 500 to 1000 Å.

EXAMPLE 3

The same procedure as used in Example 1 is repeated, but in this case, the composition of the inorganic glass is changed as is shown in Table 2.

The optical discs thus obtained were evaluated by measuring the change of BER and C/N ratio that took place after the discs had been kept at 45° C. and 90 %RH for 30 days and the deposition rate.

(The change of BER is expressed by comparison with the initial value ($=1$), the change of C/N ratio is expressed in terms of decrease (in dB) from the initial value, and the deposition rate is expressed by sputtering rate respectively.) The result is shown in TABLE 2.

TABLE 2

|  | Sample No. |  |  |  |  |  |  |  |  |  |  |  |
|---|---|---|---|---|---|---|---|---|---|---|---|---|
|  | 1 | 2 | 3 | 4 | 5 | 6 | 7 | 8 | 9 | 10 | 11 | 12 |
| Proportions of glass components (wt %) |  |  |  |  |  |  |  |  |  |  |  |  |
| SiO$_2$ |  |  | 59.6 |  | 53.5 |  | 45.0 |  |  | 49.9 |  |  |

TABLE 2-continued

| | Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $Al_2O$ | 11.5 | | 15.0 | | 10.3 | | | | 10.3 | | | |
| $B_2O$ | 8.5 | | 8.5 | | 8.5 | | | | 10.5 | | | |
| $Na_2O$ | | | 0.4 | | | | 0.5 | | 1.0 | | 2.0 | |
| $K_2O$ | | | | | | | | | | | | |
| CaO | 4.0 | | 17.5 | | 8.4 | | 3.8 | | 3.3 | | 2.3 | |
| BaO | 16.5 | | 4.5 | | 27.1 | | 25.1 | | 25.1 | | 25.1 | |
| Material of substrate  PMMA | + | | + | | + | | + | | + | | + | |
| PC | | + | | + | | + | | + | | + | | + |
| Change in C/N (Note 1) | 1 | 0 | 3 | 1 | 2 | 0 | 3 | 0 | 5 | 0 | 10 | 5 |
| BER | 1.0 | 1.0 | 2.0 | 1.2 | 1.2 | 1.0 | 2 | 1 | 5 | 1.5 | 15 | 10 |
| Velocity of film formation (Note 2) | − | − | + | + | − | − | + | + | + | + | + | + |

(Note 1) Change in C/N: the value of decrease in C/N (d/b) form the initial value under 45° C., 90 Relative Humidity after 30 days.
(Note 2) Velocity of film formation: relative sputtering rate. + = high, − = low As is shown in TABLE 2, alkali-free glass having the limited proportions of alkali metals and/or alkaline earth metals defined by the present invention can produce optical disks having improved durability and productivity.

EXAMPLE 4

The same procedure as used in Example 1 is repeated, but in this Example 4, the composition and/or the coefficient of linear expansion of the inorganic glass varied as is shown in Table 3 which also shows the result of the read-out properties of the disk.

The optical discs thus obtained were evaluated by measuring the change of BER and C/N ratio that took place after the discs had been kept at 45° C. and 90 %RH for 30 days. (The change of BER is expressed by comparison with the initial value (=1), and the change of C/N ratio is expressed in terms of decrease (in dB) from the initial value.)

TABLE 3

| | | Sample No. | | | Comparative Example 1 | | Comparative Example 2 | | Comparative Example 3 | |
|---|---|---|---|---|---|---|---|---|---|---|
| | | 21 | 22 | 23 | | | | | | |
| Composition of glass (wt %) | | | | | | | | | | |
| $SiO_2$ | | 53.5 | 49.9 | 30.8 | 80.5 | | 68.9 | | 34.5 | |
| $Al_2O_3$ | | 15.0 | 10.3 | 1.4 | 2.5 | | | | | |
| $B_2O_3$ | | 8.5 | 10.5 | 17.9 | 12.8 | | 10.1 | | 3.5 | |
| PbO | | | | | | | | | 55.0 | |
| MgO | | 4.5 | | | | | | | | |
| CaO | | 17.5 | 4.3 | | | | | | | |
| BaO | | | 25.1 | 48.7 | | | 2.8 | | 5.5 | |
| $Na_2O$ } | | 0.4 | | 0.3 | 4.1 | | 8.8 | | 2.5 | |
| $K_2O$ } | | | | | 0.5 | | 8.4 | | 2.5 | |
| Coefficient of linear expansion ($\times 10^{-7}$/°C.) | | 40 | 46 | 66 | 35 | | 74 | | 80 | |
| Material of substrate: PMMA | | o | 0 | 0 | 0 | | o | | o | |
| PC | | | o | o | o | o | | o | | o |
| Change in BER | | 2.0 1.2 | 1.5 1.2 | 1.2 1.0 | 5.0 | 1.2 | 5.0 | 1.2 | 1.2 | 1.1 |
| Change in C/N ratio | | 3 1 | 0 0 | 0 0 | 5 | 2 | 5 | 2 | 1 | 0 |

It is noted from Table 3 that when inorganic glass having a coefficient of linear expansion in the range of 40 to 70×10$^{-7}$ is used, the resulting optical discs have a small change in C/N ratio. It is also noted that the optical discs are improved in BER where the alkali-free glass is one which contains less than 1 wt% of alkali metal in terms of oxides thereof.

What is claimed is:

1. An optical information recording carrier comprising a transparent plastic substrate, an information recording layer formed on the substrate, and a layer of inorganic glass interposed between the substrate and the recording layer; the recording layer being a magneto-optical rare earth-transition metal amorphous alloy, and said layer of inorganic glass having a thickness of from 100 to 2000 Angstroms and being a glass comprising oxides and having an alkali metal content of less than 1 wt% in terms of alkali metal oxides and a coefficient of linear expansion of 40 to 70×10$^{-7}$/° C., and containing from 20 wt% to 35 wt% of alkaline earth metals in terms of alkaline earth metal oxides.

2. An optical information recording carrier as set forth in claim 1, wherein the amount of alkali metals is less than 0.8 wt% in terms of alkali metal oxides.

3. An optical information recording carrier as set forth in claim 2, wherein said alkaline earth metal oxide is at least one compound selected from a group consisting of BaO, CaO, MgO, SrO and BeO.

4. An optical information recording carrier as set forth in any one of claims 1, 2 and 3, wherein said information recording layer is made of magneto-optical recording material.

5. An optical information recording carrier as set forth in claim 1, wherein said magneto-optical recording material is amorphous alloy composed of rare earth elements and transition metals.

* * * * *